(12) United States Patent
Li et al.

(10) Patent No.: US 11,415,494 B2
(45) Date of Patent: Aug. 16, 2022

(54) METHOD OF RAPIDLY AND COMPLETELY RENDERING LIPID-DROPLET-RICH TISSUE TRANSPARENT

(71) Applicant: SHANGHAI JIAOTONG UNIVERSITY, Shanghai (CN)

(72) Inventors: Xiaowei Li, Shanghai (CN); Zhifeng Shao, Shanghai (CN); Mengjie Lai, Shanghai (CN); Jun Li, Shanghai (CN); Daniel Czajkowsky, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 88 days.

(21) Appl. No.: 16/479,874

(22) PCT Filed: Jan. 19, 2018

(86) PCT No.: PCT/CN2018/073471
§ 371 (c)(1),
(2) Date: Jul. 22, 2019

(87) PCT Pub. No.: WO2018/133847
PCT Pub. Date: Jul. 26, 2018

(65) Prior Publication Data
US 2021/0072124 A1    Mar. 11, 2021

(30) Foreign Application Priority Data
Jan. 20, 2017  (CN) .......................... 201710049563.3

(51) Int. Cl.
*G01N 1/30*    (2006.01)
(52) U.S. Cl.
CPC ..................................... *G01N 1/30* (2013.01)
(58) Field of Classification Search
CPC .................................. G01N 1/30; G01N 21/64
See application file for complete search history.

(56) References Cited

U.S. PATENT DOCUMENTS

2008/0108043 A1    5/2008  Wiederhold
2009/0286304 A1*   11/2009 Latham .............. C12N 15/1003
                                                 435/270
2015/0285718 A1   10/2015  Hatta et al.

FOREIGN PATENT DOCUMENTS

| CN | 102552981 A | 7/2012 |
|----|-------------|--------|
| CN | 103492852 A | 1/2014 |
| CN | 104155160 A | 11/2014 |
| CN | 104350372 A | 2/2015 |
| CN | 106323708 A | 1/2017 |
| CN | 106769350 A | 5/2017 |
| WO | 2016073941 A1 | 5/2016 |

OTHER PUBLICATIONS

Treweek et al. Whole-body tissue stabilization and selective extractions via tissue-hydrogel hybrids for high-resolution intact circuit mapping and phenotyping. Nat Protoc. 2015;10(11):1860-1896.*
Hu et al. Influence of Tripolyphosphate Cross-Linking on the Physical Stability and Lipase Digestibility of Chitosan-Coated Lipid Droplets. J. Agric. Food Chem. 2010;58:1283-1289.*
Mun et al. Influence of emulsifier type on in vitro digestibility of lipid droplets by pancreatic lipase. Food Research International. 2007;40:770-781.*

* cited by examiner

*Primary Examiner* — Lynn Y Fan
(74) *Attorney, Agent, or Firm* — Novick, Kim & Lee, PLLC; Zhi Yang Xue; Bin Lu

(57) ABSTRACT

A method of rapidly and completely rendering a tissue (11) rich in lipid droplets (12) transparent. The method comprises the following steps: providing a tissue sample (11) rich in lipid droplets (12) and immobilized with a hydrogel; performing a pre-transparency-rendering process on the tissue sample (11) to obtain a pre-processed sample; performing a transparency-rendering process on the pre-processed sample to obtain a transparency-rendered sample; and performing a post-transparency-rendering process on the transparency-rendered sample to obtain a final transparency-rendered sample (31). The method does not damage the fine structure of a biological tissue (11) and can significantly increase a depth of an optical image of the biological tissue (11). The method does not damage the fine structure of a biological tissue (11) and can significantly increase a depth of an optical image of the biological tissue (11).

7 Claims, 3 Drawing Sheets

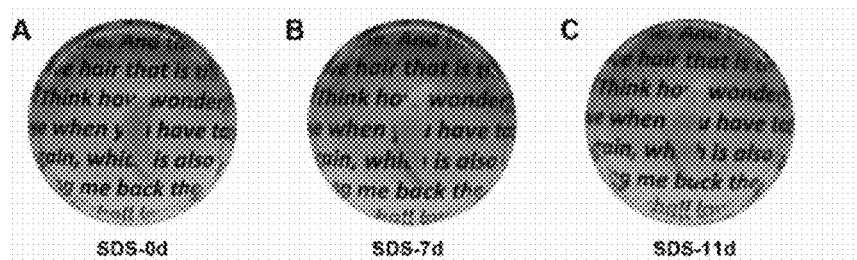
Fig. 4(A)  Fig. 4(B)  Fig. 4(C)
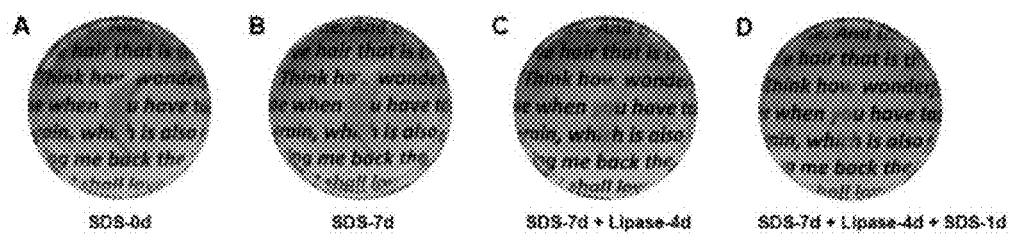
Fig. 5(A)  Fig. 5(B)  Fig. 5(C)  Fig. 5(D)
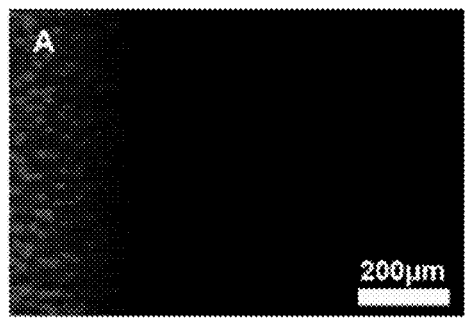 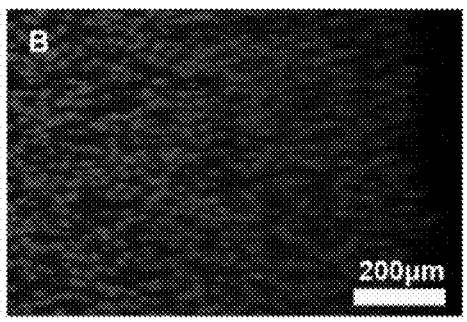
Fig. 6(A)  Fig. 6(B)

METHOD OF RAPIDLY AND COMPLETELY RENDERING LIPID-DROPLET-RICH TISSUE TRANSPARENT

TECHNICAL FIELD

The present invention relates to the field of biotechnology, and in particular to a method of rapidly and completely rendering lipid-droplet-rich tissue transparent, which can achieve complete transparency of all organs and tissues, including the entire animal body, thereby obtaining three-dimensional high-resolution structural information.

BACKGROUND

The study of the three-dimensional structure of biomedical tissues at the cellular and subcellular scales is the basis for understanding the normal functional mechanisms, and can also provide a basis for mastering the occurrence and development of organ diseases. Previous studies on tissues of human and other animals were focused on anatomical scale studies, while studies at the cellular and subcellular scales were limited by analytical capability. Usually only two-dimensional structural information of tissue sections can be studied. Tissue researches with three-dimensional reconstruction techniques based on tissue serial slices are time consuming and labor intensive. The rapid development of tissue transparency technology in recent years has made it possible to obtain high-resolution three-dimensional structures of entire biological tissues and organs. The CLARITY technology invented by Professor Deisseroth's group from Stanford University was the first to be applied to the study of transparency and three-dimensional structure of brain tissue, and gradually extended to other major organs, such as the kidney, small intestine, etc., demonstrating the great potential value of obtaining complete high-resolution three-dimensional structure information of biological tissues.

However, when CLARITY technology was applied to the transparency of all organs, it was found that even though some organs were treated with surfactant for a long time, it was still difficult to be completely transparent, which greatly limited the depth of the tissue for the three-dimensional structure research. Tissues which are difficult to be completely transparent mainly include adipose tissue, liver tissue and muscle tissue. A common feature of these tissues is that they are rich in lipid droplets. Due to the high hydrophobicity and compactness of these lipid droplets, it is difficult to remove lipid droplets from tissues using the method of degrease in CLARITY technology. These dense lipid droplets typically have a higher refractive index than other surrounding molecules, and a mismatch in refractive index causes an increase in the scattering of photons, thereby reducing the transparency of the tissue and the depth of optical imaging.

Therefore, there is an urgent need in the art for a rapid and effective method of rendering lipid-droplet-rich tissue transparent.

SUMMARY OF THE INVENTION

The objection of the present invention is to provide a treatment method for rapidly and efficiently rendering the lipid-droplet-rich tissue transparent and a corresponding kit thereof.

In a first aspect of the present invention, it provides a method of rapidly and completely rendering lipid-droplet-rich tissue transparent, which comprises the following steps:

(i) providing a lipid-droplet-rich tissue sample immobilized with a hydrogel;

(ii) performing a transparent pretreatment on the tissue sample, thereby obtaining a pretreated sample;

(iii) performing a transparent treatment on the pretreated sample, thereby obtaining a transparent sample; and (iv) performing a transparent post-treatment on the transparent sample, thereby obtaining a final transparent sample.

In another preferred embodiment, the method further comprises the steps of:

(v) dyeing and sealing the final transparent sample, thereby obtaining a test sample.

In another preferred embodiment, the lipid-droplet-rich tissue comprises: liver tissue, adipose tissue, and skeletal muscle tissue.

In another preferred embodiment, the lipid-droplet-rich tissue is in the form of a slice.

In another preferred embodiment, the lipid-droplet-rich tissue is a slice with a thickness of 0.5-1 mm.

In another preferred embodiment, the lipid-droplet-rich tissue has a thickness of 1-15 mm.

In another preferred embodiment, the transparent pretreatment is to wash the lipid-droplet-rich tissue sample with a surfactant solution.

In another preferred embodiment, the surfactant is selected from the group consisting of sodium dodecyl sulfate (SDS), Triton X-100, and a combination thereof. Preferably, the surfactant is SDS.

In another preferred embodiment, the SDS concentration is from 4% to 8%.

In another preferred embodiment, the lipid-droplet-rich tissue sample is washed with the surfactant for 7-11 days.

In another preferred embodiment, the transparent treatment is to digest the pretreated sample with a lipase mixture.

In another preferred embodiment, the lipase mixture is a mixture containing lipase, cholic acid and a chloride salt, wherein the cholic acid is selected from the group consisting of taurocholic acid, taurodeoxycholic acid, and a combination thereof.

In another preferred embodiment, the cholic acid further comprises a salt or a salt hydrate of taurocholic acid or taurodeoxycholic acid.

In another preferred embodiment, the concentration of lipase in the lipase mixture is from 2000 unit/mL to 6000 unit/mL.

In another preferred embodiment, the concentration of cholic acid in the lipase mixture is from 3 mM to 11 mM.

In another preferred embodiment, the lipase mixture comprises a chlorine salt selected from the group consisting of:

300-500 mM NaCl, and/or 2-10 mM $CaCl_2$.

In another preferred embodiment, the pretreated sample is digested with the lipase mixture for 3 to 7 days.

In another preferred embodiment, the transparent post-treatment is to wash the transparent sample with a surfactant solution.

In another preferred embodiment, the transparent sample is washed with a surfactant solution for 1-3 days.

In another preferred embodiment, between steps (i) and (ii), and/or between steps (ii) and (iii), and/or between steps (iii) and (iv), and/or between steps (iv) and (v), the method further comprises washing the sample with a buffer.

In another preferred embodiment, the buffer is selected from the group consisting of PBS buffer, PBST buffer, borate buffer, and a combination thereof.

In another preferred embodiment, the final transparent sample is stained with a tissue dye solution selected from the group consisting of Hoechst dye solution, DAPI dye solution, and Tomato-Lectin dye solution.

In a second aspect of the present invention, it provides a kit for rendering lipid-droplet-rich tissue transparent, which comprises:

(1) a first container which contains a first reagent composition comprising a surfactant;

(2) a second container which contains a second reagent composition comprising cholic acid and lipase;

(3) an optional third container which contains a third reagent composition comprising a chloride salt solution, a buffer, and/or a tissue dye solution; and (4) an optional operating instruction.

In a third aspect of the present invention, it provides a test sample of transparent tissue comprising:

(a) a final transparent sample prepared by the method of the first aspect of the invention;

(b) tissue dye solution;

(c) a slide;

(d) a coverslip; and (e) adhesive.

In another preferred embodiment, the adhesive is a blu-tack.

In another preferred embodiment, the final transparent sample has a lipid droplet content of ≤10%.

In another preferred embodiment, the test sample of transparent tissue has an attenuation depth of 0.5-1 mm.

In another preferred embodiment, the test sample of transparent tissue has an attenuation depth of 1-15 mm.

It should be understood that, within the scope of the present invention, each technical feature of the present invention described above and in the following (as examples) may be combined with each other to form a new or preferred technical solution, which is not listed here due to space limitations.

DESCRIPTION OF FIGURE

FIGS. 4(A), 4(B), and 4(C) show the transparency effect of mouse liver slices (1 mm thick) after 4% SDS treatment.

FIGS. 5(A), 5(B), 5(C), and 5(D) show the transparency effect of mouse liver slices (1 mm thick) after lipase digestion.

FIGS. 6(A) and 6(B) show the comparison of imaging depth of tissues after different degreasing methods.

FIG. 8(A) shows Lipid droplets in liver tissue without transparent treatment; FIG. 8(B) shows lipid droplets in liver tissue treated with conventional CLARITY method (i.e., 4% SDS); FIG. 8(C) shows lipid droplets in liver tissue after transparent treatment with the method of the present invention.

FIG. 9(A) shows transparency effect treated with conventional CLARITY method (i.e., 4% SDS) FIG. 9(B) shows transparency effect treated with the method of the present invention.

DETAILED DESCRIPTION

After extensive and intensive studies, the inventors have firstly and unexpectedly discovered a combination of agents for rendering lipid-droplet-rich tissue transparent and a method thereof. Experiment data have shown that digesting highly hydrophobic and dense lipid droplets with lipase, and combining with the use of surfactant (such as SDS), can completely remove the highly hydrophobic and dense lipid droplets from the tissue, thereby greatly reducing high astigmatic substances in the tissue and obtaining a completely transparent intact tissue. This method can substantially increase the depth of optical imaging of lipid-droplet-rich tissue, making three-dimensional optical imaging of intact tissues and structural analysis at the cellular and subcellular scales possible. On this basis, the inventors completed the present invention.

Terms

Transparency

As used herein, the term "transparency" refers to the necessary treatment of a tissue sample by chemical or physical means to transform an opaque tissue into a completely transparent tissue, the core of which is to reduce scattering of light when it propagates through the tissue. The transparent tissue can be directly observed by an optical instrument such as an optical microscope.

Lipid Droplets

As used herein, the term "lipid droplet" is an important energy storage organelle, which is present in most eukaryotic cells with a size ranging from tens of nanometers in non-adipocytes to 100 micrometers in adipocytes. The structure of a lipid droplet consists of two parts, including an extremely hydrophobic and dense core surrounded by a single layer of phospholipid membrane. The main chemical components of the hydrophobic core are triacylglycerol and sterol ester.

Lipase

As used herein, the term "lipase", also known as glyceride hydrolase, is a type of enzyme that catalyzes a lipolytic reaction. Lipase catalyzes hydrolysis of triglycerides, thereby breaking down triglycerides into glycerol and fatty acids.

Attenuation Depth

As used herein, the term "attenuation depth" is defined as the depth at which a fluorescent signal detected by a fluorescence microscope is attenuated to half of the initial signal.

In the present invention, the test sample of the transparent tissue can be with an attenuation depth of up to about 20 mm, and can fully satisfy the requirements of a thin slice (such as 0.5-1 mm) or a thick tissue sample (usually about 1-15 mm).

Figure 1:
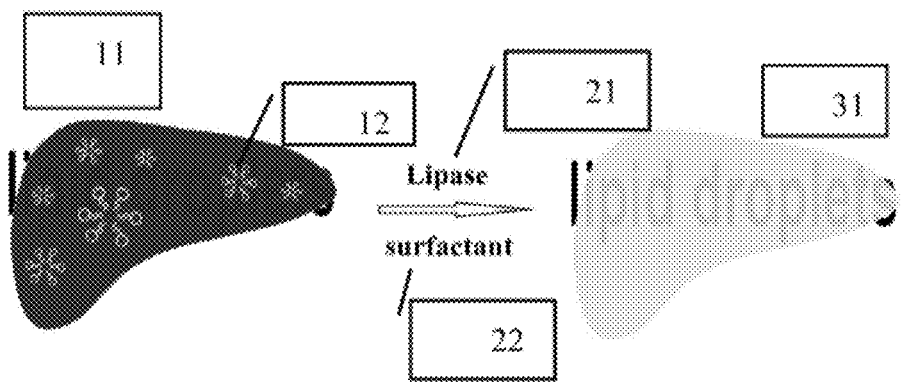
FIG. 1 is a basic schematic diagram of the method for rendering lipid-droplet-rich tissue transparent of the present invention.
- 11: non-transparent tissue
- 12: lipid droplet
- 21: lipase
- 22: surfactant
- 31: transparent tissue

Method for Rendering Lipid-Droplet-Rich Tissue Transparent in the Present Invention For the hydrogel immobilization treatment of lipid-droplet-rich tissue, the hydrogel immobilization treatment used hereof is a conventional technical means well known to those skilled in the art. In the method of the present invention, a preliminary transparency is first carried out with a surfactant, and then a lipase (such as porcine pancreatic lipase) is added to hydrolyze the lipid droplets enriched in the tissue. Lipase is an enzyme that catalyzes the hydrolysis of fat, which digests one or even two fatty acid chains on a tri-chain triglyceride. The digested product (such as a small lipid molecule) is further separated from the tissue in the form of SDS microcapsules by binding to a surfactant such as SDS to achieve rapid and complete transparency of the lipid-droplet-rich sample. FIG. 1 is a basic schematic diagram of the method for rendering lipid-droplet-rich tissue transparent in the present invention.

Attenuation Depth Test Method

The present invention uses a fluorescently labeled sample as a standard sample for testing the attenuation depth, and measures an attenuation curve in which the fluorescence signal decreases as the imaging depth increases. Based on the normalized attenuation curve, when the fluorescence signal attenuates to the half the original signal intensity, the depth of imaging is the attenuation depth.

The present invention is further described below with reference to specific embodiments. It should be understood that these examples are only for illustrating the present invention and not intended to limit the scope of the present invention. The conditions of the experimental methods not specifically indicated in the following examples are usually in accordance with conventional conditions, or according to the manufacturer's proposed conditions. Unless otherwise stated, the materials used in the examples are all commercially available products.

EXAMPLE 1

Making Liver Tissue Rich in Lipid Droplets Completely Transparent (Taking Liver Tissue as an Example for Transparency Treatment)

1.1 Preparation of Solutions
1) Preparation of SDS Washing Solution
The formulation of 5 L SDS (sodium dodecyl sulfate) washing solution with a concentration of 4% was as follows:

| ingredient | amount added | final concentration |
| --- | --- | --- |
| SDS (sodium dodecyl sulfate) | 200 g | 4% |
| boric acid | 61.83 g | 200 mM |
| Sodium hydroxide | about 10 g | adjusted to pH 8.5 |
| deionized water | 5 L | — |

2) Preparation of Lipase Digestion Solution
1) Firstly, 3 M sodium chloride (NaCl), 1.5% (w/v) taurocholic, and 75 mM calcium chloride ($CaCl_2$) were prepared respectively.

| ingredient | amount added | amount of deionized water added | final concentration |
| --- | --- | --- | --- |
| NaCl | 8.76 g | 50 ml | 3M |
| taurocholic | 0.25 g | 16.7 ml | 1.5% (w/v) |
| $CaCl_2$ | 0.42 g | 50 ml | 75 mM |

2) The formulation of 15 mL mixture is as follows:

| ingredient | amount added | final concentration |
| --- | --- | --- |
| 3M NaCl | 2 ml | 400 mM |
| 1.5% (w/v) taurocholic | 2 ml | 0.2% (w/v) |
| 75 mM $CaCl_2$ | 1 ml | 5 mM |
| deionized water | 10 ml | — |

3) The pH was adjusted to about 7.7. 60000 unit of lipase was dissolved in the mixture.

1.2 Lipid Removal
1) Excess gel on the surface of the liver sample was removed, and the samples were cut into 1 mm thick slices of liver with an oscillating microtome (VT1200s, Leica).
2) The cut liver slices in the first step were incubated at 37° C. for 7 days in 50 mL 4% SDS washing solution, and washed at 37° C. for 7 days, during which the solution was changed once a day.
3) The treated liver slices were randomly divided into an experimental group and a control group, and the degree of transparency of the liver slices at this moment was photographed.
4) The liver slices from the experimental group were taken out from the SDS washing solution, and the SDS washing solution was washed off with 1× PBS. The liver slices were placed in the prepared lipase digestion solution, and incubated at 37° C. for 4 days (for 1 mm of the liver tissue sample) or 7 days (about 20 mm for the intact liver). The liver slices from the control group were continuously washed in 4% SDS washing solution for 4 or 7 days. Photographs were taken to record the degree of transparency of the liver slices (or intact liver) from the experimental and control groups.
5) The liver slices from the experimental group were taken out from the lipase digestion solution, and the lipase digestion solution washed off with 1× PBS. Then the liver slices were put into 50 mL of 4% SDS washing solution for 1-2 days. The liver slices of the control group were continuously washed in 4% SDS washing solution for 1-2 days. Photographs were taken to record the degree of transparency of the liver slices from the experimental group and the control group.

Figure 2:
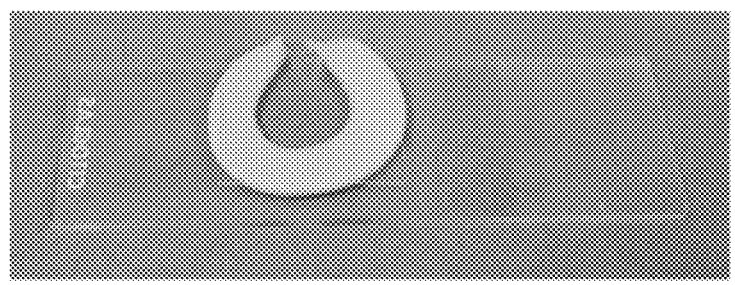
FIG. 2 shows the sealing treatment of the sample.
Figures 3A, 3B:
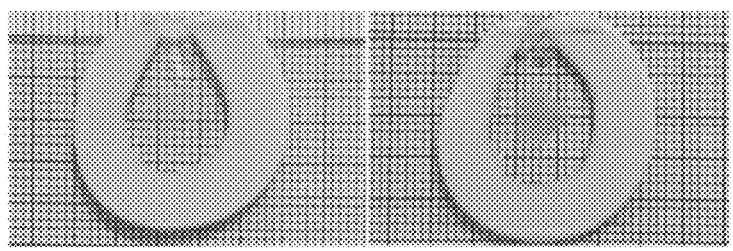
FIG. 3(a) shows the liver slice of the experimental group.
FIG. 3(b) shows the liver slice of the control group.

1.3 Hoechst Staining and Imaging
1) Hoechst33342 was diluted 1:1000 to formulate a Hoechst dye solution.
2) The liver slices from the experimental group and the control group were incubated at room temperature for 12 hours in Hoechst dye solution.
3) The liver slices from the experimental group and the control group were transferred into 15 mL PBST, and the Hoechst33342 dye was washed away. The solution was placed at room temperature and away from light for 12 hours (PBST was changed every 6 hours).
4) The liver slices from the experimental group and control group were taken out from the dye solutions, and placed in the refractive index matching liquid FocusClear to match the refractive index for 12 hours.
5) As shown in FIG. 2, the liver slice was horizontally sealed between the slide and the cover glass together with a refractive index homogenizing liquid (such as FocusClear, RIMS) using blu-tack as an adhesive. The sealed liver slice in experimental group is shown in FIG. 3(a), while the sealed liver slice in control group is shown in FIG. 3(b).
6) A 3D fluorescence image was taken using a confocal laser scanning microscope (Nikon A1Si Confocal microscope), CFI Plan Apo 10× Objective (NA=0.45, W.D.=4.0 mm).

1.4 Lipid Staining and Imaging

1) Bodipy-493/503 (Invitrogen) was formulated into a solution of 2 ug/mL.

2) The liver slices from the experimental group and the control group were incubated at room temperature for at least 12 hours in Bodipy-493/503 solution.

3) The liver slices were washed 3 times with PBST for 1 hour each time.

4) As shown in FIG. 2, the liver slice was horizontally sealed between the slide and the cover glass together with a refractive index homogenizing liquid (such as FocusClear, RIMS) using blu-tack as an adhesive.

5) A 3D fluorescence image was taken using a confocal laser scanning microscope (Nikon A1Si Confocal microscope), CFI Plan Apo 10× Objective (NA=0.45, W.D.=4.0 mm).

1.5 Image Processing and Analysis

The fluorescence image of section (XZ or YZ) perpendicular to the shooting plane in the 3D image was obtained using the NIS-Elements (Nikon Instruments) image acquisition software. The pixel values at the same imaging depth of the fluorescence image were summed and normalized after the background of the fluorescence image subtracted. The trend that fluorescence signal in liver slices attenuated as the imaging depth increases was displayed by the changes in pixel values at different depths after normalization. All image and data processing is done in MATLAB.

Result Analysis 2.1 Degreasing Effect of SDS and the Limitations Thereof

FIG. 4(B) shows the liver slice after 7 days of treatment with 4% SDS washing solution. Compared with the liver slice before treatment (FIG. 4(A)), the color of the liver slice becomes shallow, indicating that a part of the lipid in the liver slice is indeed taken away by SDS. However, by comparing the effects of SDS treatment for 7 days (FIG. 4(B)) and 11 days (FIG. 4(C)), it can be seen that simply extending the time of SDS treatment of liver slices does not achieve significant complete lipid removal, or the effect of making the liver piece completely transparent.

2.2 Degreasing Effect of Lipase

FIG. 5(A) shows an untreated sample. The liver slice washed in SDS for 7 days (FIG. 5(B)) was placed and incubated in a lipase digestion solution for 4 days (FIG. 5(C)). The photos of liver slice before and after treatment with lipase digestion solution were compared. It was found that the transparency of the liver slices was significantly improved. The lipase-treated liver slice was put back into the 4% SDS washing solution and treated for 1 day. It was found that the whole liver slice was nearly transparent (FIG. 5(D)). Compared with the liver slice only incubated in 4% SDS for 11 days (FIG. 4(C)), the fat-removing effect of the lipase-treated liver slices was more thorough.

Figures 9A, 9B:
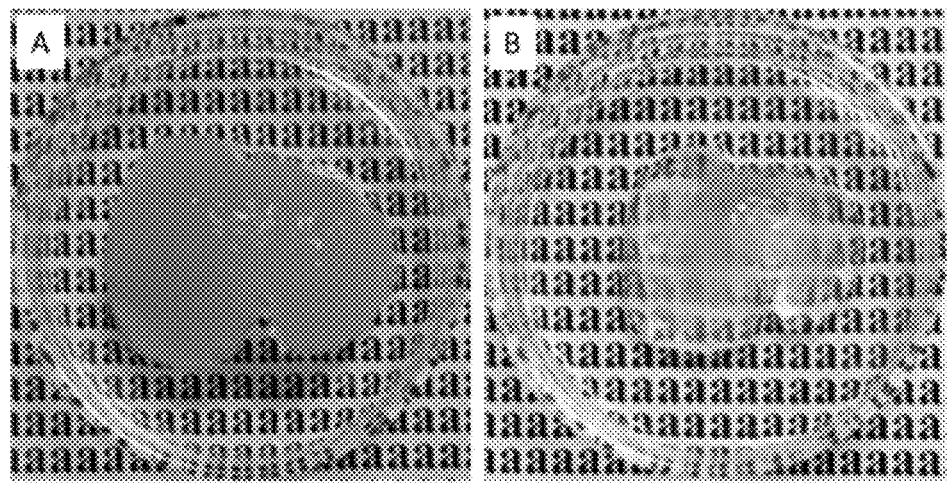
FIGS. 9(A) and 9(B) show the comparison of transparency effects of different methods for treating intact liver.

FIG. 9(A) and FIG. 9(B) show a comparison of the effects of intact liver organs treated with different ways. FIG. 9(A) shows the liver treated with the conventional CLARITY transparency method; FIG. 9(B) shows the liver treated with the method of the present invention; and the treating times for the liver samples of both methods were completely same. It can be seen that the method of the present invention is significantly more effective in rendering the intact liver transparent than the conventional CLARITY method.

Figures 8A, 8B, 8C:
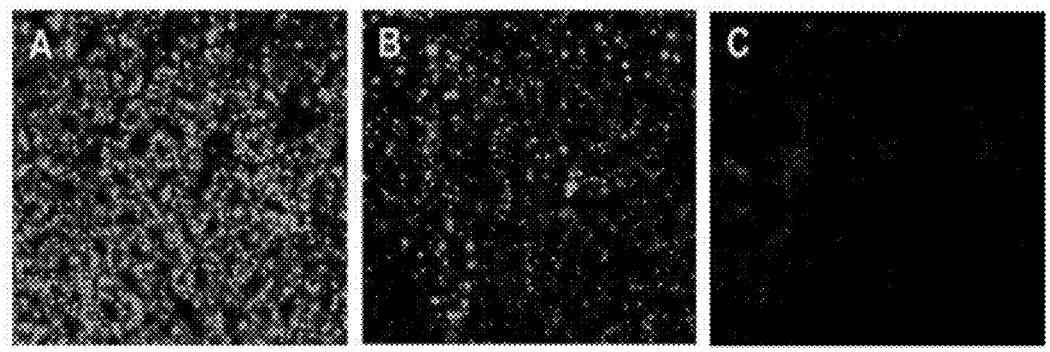
FIGS. 8(A), 8(B), and 8(C) show the comparison of lipid droplets in liver tissues after different degreasing methods (green).

FIGS. 8(A), 8(B) and 8(C) show a comparison of lipid droplets (green signal) in liver tissues treated with different delipidization methods. FIG. 8(A) shows lipid droplets in liver tissue after treatment with PBS; FIG. 8(B) shows lipid droplets in liver tissue after being rendered transparent by the conventional CLARITY method; and FIG. 8(C) shows lipid droplets in liver tissue after transparency treatment by the method of the present invention. The experimental results show that using the method of the present invention can greatly reduce lipid droplets in liver tissue, which is one of the main reasons for the excellent transparency effect of liver tissue prepared by the method of the present invention.

Figure 7:
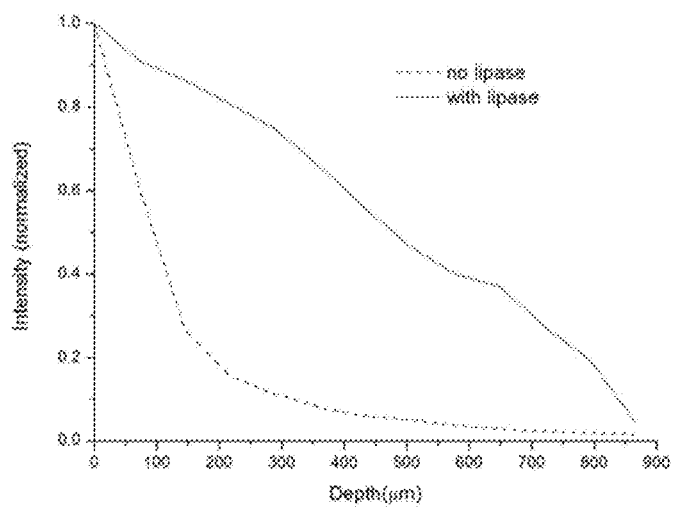
FIG. 7 shows the comparison of the attenuation of fluorescence signal as the imaging depth increases.

2.3 Comparison of Hoechst Staining Imaging Results with Different Treatment Methods Hoechst staining results of mouse liver slices obtained by lipase delipidization method are shown in FIG. 6(B). In the lipase experimental group, the nuclei at different depths in the liver slices were well labeled and imaged. In the SDS control group (FIG. 6(A)), under the same refractive index matching condition, the fluorescence signal rapidly attenuates as the imaging depth increases (FIG. 7). If calculated with the thickness at which the fluorescence signal is reduced to half the peak value, the depth of imaging of the lipase delipidization method is 475 um, which is 5 times the depth of the SDS delipidization method (95 um). It shows that the treatment with lipase is helpful to improve the transparency of liver samples and achieve deep imaging of liver samples. It should be noted that due to the use of air lens imaging, the refractive index of air (refractive index of 1) and the transparent sample (about 1.45) cause the thickness of the obtained image to be smaller than the thickness of the sample. Here, the imaging depth of 475 um is equivalent to the thickness of 679 um of the sample.

The main advantages of the invention include:

(1) The method of the present invention can significantly increase the transparency degree and optical imaging depth of lipid-droplet-rich tissue. The experimental results show that the method can increase the depth of optical imaging by 5 times compared with the conventional method which relies on the surfactant only.

(2) The method of the present invention can completely make liver tissue and other lipid-droplet-rich tissue transparent. Experiments have shown that when the treating time of liver tissue by lipase digestion solution was extended from 4 days to 7 days, after the SDS washing solution cleared, a completely transparent liver can be obtained, and the structure of the biological tissue was not damaged.

(3) The method of the present invention does not cause any damage to the structure of biological tissues. The method does not cause damage to the fine structures of biological tissues.

(4) The method of the present invention has greatly expanded the application range of tissue transparency technology. Using the method in combination with other existing tissue transparency methods can achieve complete transparency of all organs and tissues, including the entire animal body, thereby obtaining three-dimensional high-resolution structural information.

All publications mentioned herein are incorporated by reference as if each individual document was cited as a reference in the present application. It should also be understood that, after reading the above teachings of the present invention, those skilled in the art can make various changes or modifications, equivalents of which falls in the scope of claims as defined in the appended claims.

The invention claimed is:

1. A method of rapidly and completely rendering lipid-droplet-rich tissue transparent, which comprises the following steps:
   (i) providing a lipid-droplet-rich tissue sample immobilized with a hydrogel;
   (ii) performing a transparent pretreatment on the tissue sample, thereby obtaining a pretreated sample;

(iii) performing a transparent treatment on the pretreated sample, thereby obtaining a transparent sample; and
(iv) performing a transparent post-treatment on the transparent sample, thereby obtaining a final transparent sample;

wherein the transparent pretreatment is to wash the lipid-droplet-rich tissue sample with a 4% sodium dodecyl sulfate (SDS) surfactant solution;

the transparent treatment is to digest the pretreated sample with a lipase mixture;

and the transparent post-treatment is to wash the transparent sample with a 4% SDS surfactant solution.

2. The method of claim 1, which further comprises the step of:
(v) dyeing and sealing the final transparent sample, thereby obtaining a test sample.

3. The method of claim 1, wherein the pretreated sample is digested with the lipase mixture for 3 to 7 days.

4. The method of claim 3, wherein the lipase mixture is a mixture containing lipase, cholic acid and a chloride salt, wherein the cholic acid is selected from the group consisting of taurocholic acid, taurodeoxycholic acid, and a combination thereof.

5. The method of claim 4, wherein the concentration of lipase in the lipase mixture is from 2000 unit/mL to 6000 unit/mL.

6. The method of claim 4, wherein the concentration of cholic acid in the lipase mixture is from 3 mM to 11 mM.

7. The method of claim 4, wherein the lipase mixture comprises a chlorine salt selected from the group consisting of 300-500 mM NaCl and 2-10 mM $CaCl_2$.

* * * * *